United States Patent
Jenkins et al.

(10) Patent No.: US 7,072,542 B2
(45) Date of Patent: Jul. 4, 2006

(54) MULTI-MODE INTERFERENCE OPTICAL WAVEGUIDE DEVICE

(75) Inventors: Richard Michael Jenkins, Malvern (GB); Mark Edward McNie, Malvern (GB)

(73) Assignee: Qinetiq Limited (GB)

( * ) Notice: Subject to any disclaimer, the term of this patent is extended or adjusted under 35 U.S.C. 154(b) by 0 days.

(21) Appl. No.: 10/502,910

(22) PCT Filed: Jan. 29, 2003

(86) PCT No.: PCT/GB03/00370

§ 371 (c)(1),
(2), (4) Date: Jul. 28, 2004

(87) PCT Pub. No.: WO03/065088

PCT Pub. Date: Aug. 7, 2003

(65) Prior Publication Data

US 2005/0053322 A1    Mar. 10, 2005

(30) Foreign Application Priority Data

Jan. 29, 2002  (GB) .............................. 0201950.3

(51) Int. Cl.
    *G02B 6/26*  (2006.01)

(52) U.S. Cl. .................... 385/28; 385/130; 385/132

(58) Field of Classification Search .............. 385/15, 385/28, 39, 40, 125, 129–132, 140; 372/45, 372/50

See application file for complete search history.

(56) References Cited

U.S. PATENT DOCUMENTS

| | | | |
|---|---|---|---|
| 5,379,354 A | | 1/1995 | Jenkins |
| 5,396,570 A | | 3/1995 | Jenkins et al. |
| 5,410,625 A | * | 4/1995 | Jenkins et al. ................ 385/28 |
| 5,428,698 A | * | 6/1995 | Jenkins et al. ................ 385/27 |
| 5,475,776 A | | 12/1995 | Jenkins et al. |
| 5,675,603 A | | 10/1997 | Jenkins |
| 5,684,820 A | | 11/1997 | Jenkins |
| 5,737,458 A | * | 4/1998 | Wojnarowski et al. ........ 385/15 |
| 6,717,970 B1 | * | 4/2004 | Marsh et al. ................. 372/50 |
| 2004/0240775 A1 | | 12/2004 | Jenkins |
| 2004/0247235 A1 | | 12/2004 | Jenkins et al. |
| 2004/0252934 A1 | | 12/2004 | Jenkins |

FOREIGN PATENT DOCUMENTS

| | | |
|---|---|---|
| EP | 0 876625 | 7/2002 |
| WO | WO 93/25923 | 12/1999 |

OTHER PUBLICATIONS

Harrington, J.A. "A Review of IR Transmitting, Hollow Waveguides", Fiber and Integrated Optics, vol. 19, pp. 211-227 (2000).

* cited by examiner

*Primary Examiner*—Frank G. Font
*Assistant Examiner*—Michael P. Mooney
(74) *Attorney, Agent, or Firm*—McDonnell Boehnen Hulbert & Berghoff LLP

(57) ABSTRACT

A multi-mode interference (MMI) device, comprising a hollow core multi-mode waveguide optically coupled to at least one hollow core input waveguide, is described in which the internal surfaces of the hollow core waveguides carry a reflective coating. The coating may be a low refractive index material at the wavelength of operation, such as a metal, or a multiple layer dielectric stack. Resonators and optical amplifiers using such (MMI) devices are also described.

27 Claims, 7 Drawing Sheets

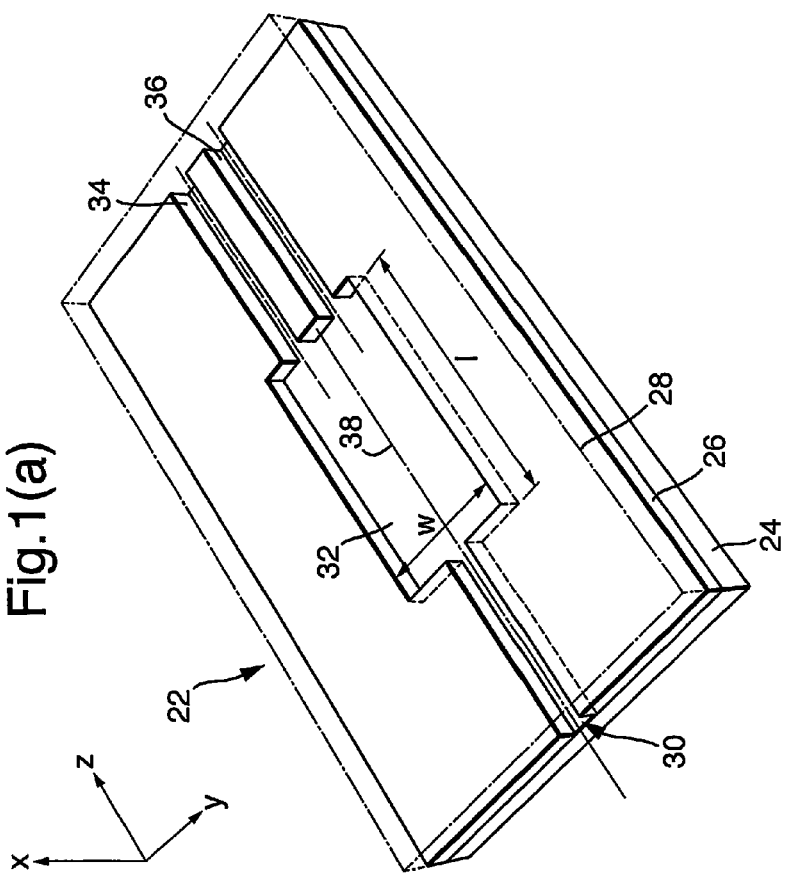
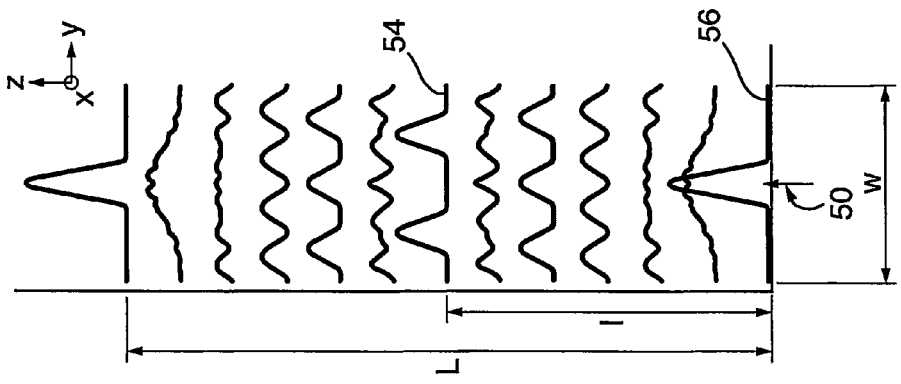
Fig. 1.
(Prior Art)
Fig. 1(b)

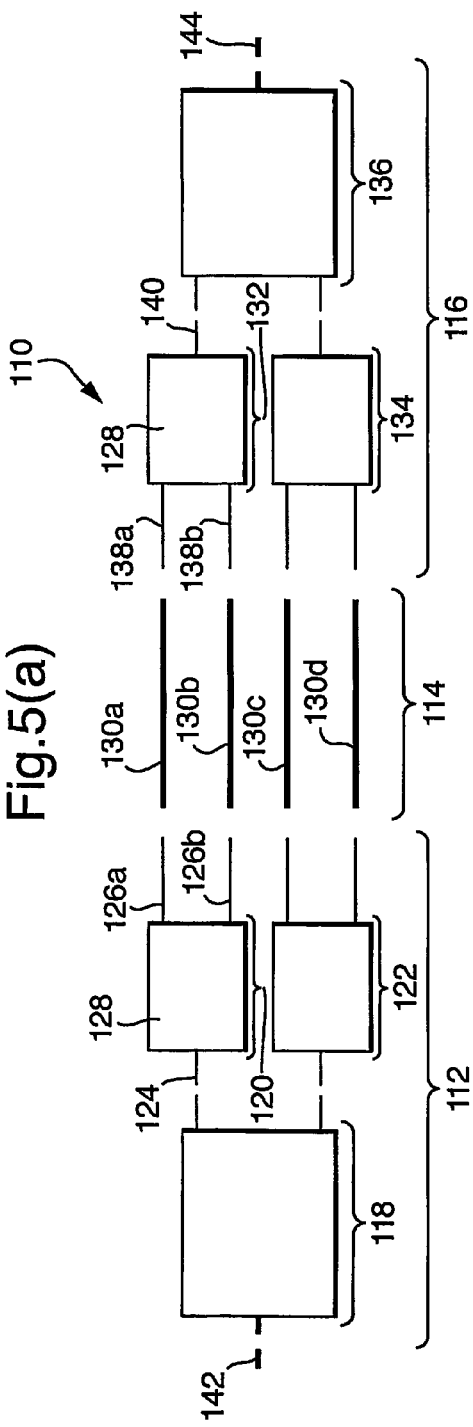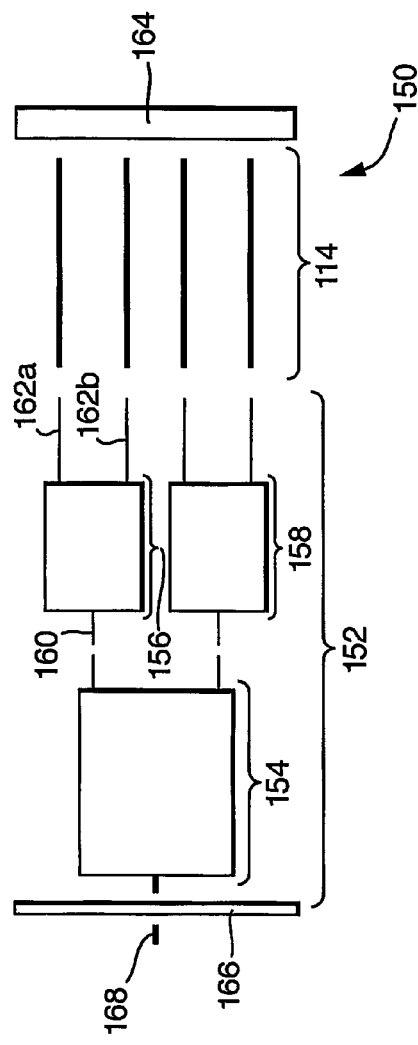

MULTI-MODE INTERFERENCE OPTICAL WAVEGUIDE DEVICE

BACKGROUND OF THE INVENTION

1. Field of the Invention

This invention relates to multi-mode interference (MMI) optical waveguide devices.

2. Description of Related Art

U.S. Pat. No. 5,410,625 describes a multi-mode interference (MMI) device for beam splitting and recombining. The device comprises a first coupling waveguide and two or more second coupling waveguides that are connected to a central multi-mode waveguide region. The coupling waveguides operate only in fundamental mode, and the physical characteristics of the coupling and multi-mode waveguide regions are selected such that modal dispersion within the central multi-mode waveguide region provides for a single beam of light input in to the first coupling waveguide to be split into the two or more second coupling waveguides. The device may also be operated in reverse as a beam combiner.

Variations and improvements to the basic MMI devices of U.S. Pat. No. 5,410,625 are also known. U.S. Pat. No. 5,379,354 describes how variation of input guide location can be used to obtain a multi-way beam splitter that provides division of the input radiation into outputs beams having differing intensities. Use of MMI devices to form laser cavities has also been demonstrated in U.S. Pat. No. 5,675,603. Various combinations of MMI splitter and recombiner devices have also been used to provide an optical routing capability; for example, see U.S. Pat. No. 5,428,698.

Solid core MMI waveguide devices are known in which the coupling and multi-mode waveguides are formed from solid ridges of semiconductor material, such as Gallium Arsenide (GaAs), that are upstanding from a substrate. Solid core MMI waveguide devices are typically fabricated from layers of GaAs. A disadvantage of solid core materials is the limited total power density which they can transmit before damage to the solid core material occurs.

MMI devices are also known in which the coupling and multi-mode waveguides are formed as hollow cavities (i.e. air cavities) within substrates of solid dielectric material, such as alumina. The dielectric substrate material is selected to have a refractive index less than the air core at the particular wavelength of operation of the device. Hollow core dielectric devices are typically fabricated by a precision engineering (e.g. milling) process and are typically physically larger in size than their solid core counterparts. Precise control over the dimensions of such devices, which is important for obtaining optimum performance, can also prove challenging.

BRIEF SUMMARY OF THE INVENTION

It is an object of this invention to provide an alternative MMI optical waveguide device.

According to a first aspect of the present invention, a multi-mode interference (MMI) device comprises a hollow core multi-mode waveguide region optically coupled to at least one hollow core input waveguide, characterised in that the internal surfaces of the hollow core waveguides carry a reflective coating.

Hollow core MMI devices of the present invention may be operated as beam combiners, beam splitters, multi-way beam intensity dividers etc.

An advantage of the present invention is that the hollow core waveguide structures (i.e. the substrate that defines the hollow core waveguide structures) on which the reflective coating is located may be formed from any material. This is an advantage over prior art hollow core MMI devices which are fabricated from specific materials (such as alumina) to ensure optical losses were minimised. The present invention thus permits the waveguides to be fabricated using a variety of materials and processes that was not previously thought possible by those skilled in the art. In particular, this invention provides the opportunity to fabricate physically small hollow core waveguide devices using high precision micro-fabrication techniques; the restrictions on minimum hollow core device size that were imposed by the use of traditional precision engineering techniques have thus been overcome.

It should also be noted that the hollow core waveguides may be produced in a variety of ways. The waveguides may be formed in unitary pieces of material, they may be formed from two separate pieces of material (such as a base and a lid) or they may be formed from a plurality of different pieces of material (e.g. separate sections of material that, when located together, define the required fundamental mode and multi-mode waveguide regions).

The hollow core waveguides of the present invention allow device operation with high levels of optical power. This is an advantage over prior art solid core waveguides, in which the maximum optical power density is limited by the physical properties of the material forming the solid core.

Advantageously, the reflective coating comprises a layer of material having a refractive index less than that of the waveguide core within the operating wavelength band. The layer of material having a refractive index lower than the hollow waveguide core produces total internal reflection (TIR) of light within the MMI device thereby providing a hollow core device having low associated levels of optical loss.

It should be noted that when hollow core optical waveguide structures are produced, the hollow core is likely to fill with air. Herein the refractive index of the core is thus assumed to be that of air at atmospheric pressure and temperature (i.e. n≈1). However, this should be seen in no way as limiting the scope of this invention. The hollow core may contain any fluid (for example an inert gas such as nitrogen) or be a vacuum. The term hollow core simply means a core which is absent any solid material. Also, the term total internal reflection (TIR) shall be taken herein to include attenuated total internal reflection (ATIR).

In a further embodiment, the layer of low refractive index material carried on the internal surface of the hollow core waveguides is a metal; for example gold, silver or copper.

The properties of gold, silver and copper therefore make these metals particularly suited to inclusion in MMI devices for operation in the telecommunications wavelength band (i.e. for use with wavelengths centred around 1.55 μm).

Metals will exhibit a suitably low refractive index over a wavelength range that is governed by the physical properties of the metal; standard text books such as "the handbook of optical constants" by E. D. Palik, Academic Press, London, 1998, provide accurate data on the wavelength dependent refractive indices of various materials. In particular, gold has a refractive index less than that of air for wavelengths within the range of around 1400 nm to 1600 nm. Copper exhibits a refractive index less than unity over the wavelength range of 560 nm to 2200 nm, whilst silver has similar refractive index properties over a wavelength range of 320 nm to 2480 nm.

The layer of metal may be deposited using a variety of techniques known to those skilled in the art. These techniques include sputtering, evaporation, chemical vapour deposition (CVD) and (electro or electo-less) plating. CVD and plating techniques allow the metal layers to be deposited without any direction dependent thickness variations. Plating techniques also permit batch processing to be undertaken.

A skilled person would recognise that adhesion layers and/or barrier diffusion layers could be deposited on the hollow core waveguide prior to depositing the layer of metal. For example, a layer of chrome or titanium could be provided as an adhesion layer prior to the deposition of gold. A diffusion barrier layer, such as platinum, may also be deposited on the adhesion layer prior to gold deposition. Alternatively, a combined adhesion and diffusion barrier layer (such as titanium nitride or titanium tungsten alloy or an insulator such as silicon oxide) could be used.

Conveniently, the reflective coating may also comprise one or more layers of dielectric material. The dielectric material may be deposited by CVD or sputtering. Alternatively, a dielectric layer could be formed by chemical reaction with a deposited metal layer. A deposited layer of silver could be chemically reacted with a halide to produce a thin surface layer of silver halide. For example, a silver iodide (AgI) coating could be formed on the surface of silver by exposing it to $I_2$ in the form of a potassium iodide (KI) solution In other words the reflective coating may be provided by an all-dielectric, or a metal-dielectric, stack. A person skilled in the art would recognise that the optical thickness of the dielectric layer(s) gives the required interference effects and thus determines the reflective properties of the coating. The reflective properties of the coating may also be dependent, to some extent, on the properties of the material in which the hollow core waveguides are formed.

The device may advantageously be configured to operate across the wavelength range 0.1 μm and 20.0 μm, and more preferably in the infra-red bands of 3–5 μm or 10–14 μm. Advantageously, the device operates with radiation between 1.4 μm and 1.6 μm in wavelength.

Conveniently, the at least one hollow core input waveguide is a fundamental mode waveguide. Alternatively, the at least one hollow core input waveguide is a multi-mode waveguide. As described in more detail below, a fundamental mode or multi-mode waveguide may be used to couple radiation into, or out of, the hollow core multi-mode waveguide region.

Preferably, the at least one hollow core input waveguide comprises a hollow core optical fibre. In other words, a hollow core optical fibre may be arranged to directly couple radiation into the multi-mode waveguide region.

Advantageously, the device additionally comprises an optical fibre that is directly optically coupled to the hollow core multi-mode waveguide region. The optical fibre may comprise a hollow or solid core. It would also be apparent to the skilled person that such a solid core optical fibre could be used in place of the at least one hollow core input waveguide of the present invention.

Conveniently, the hollow core multi-mode waveguide region has a substantially rectangular cross-section. As described below, this can provide an MMI beam splitter or recombiner. It is preferred for the dimensions (i.e. width, length and depth) of such a hollow core multi-mode waveguide region to be selected to provide re-imaging (i.e. to produce one or more images of the input beam) of the optical input field carried by said at least one hollow core input waveguide.

Conveniently, opposite surfaces forming the rectangular internal cross-section of the hollow core multi-mode waveguide region have substantially equal effective refractive indices and adjacent surfaces forming the rectangular internal cross-section hollow core multi-mode waveguide region have different effective refractive indices. In this manner, the device can be arranged to have reduced optical losses when guiding light of a known linear polarisation.

In some embodiments, the hollow core multi-mode waveguide region may have a substantially circular cross-section and the diameter and length of the hollow core multi-mode waveguide region are selected to provide re-imaging of the optical input field carried by said at least one hollow core input waveguide. It should be noted that beam splitting is not possible with such a circular multi-mode region, only re-imaging effects are observed.

In a further embodiment, the layer of material carried on the internal surface of the hollow core waveguides is Silicon Carbide. As described above, the additional layer of low refractive index material can be selected to provide efficient MMI operation at any required wavelength. Silcon Carbide has a refractive index of 0.06 at 10.6 μm, making such material particularly suited for inclusion in MMI devices operating at such a wavelength.

Conveniently, the hollow core waveguides are formed in semiconductor material; for example silicon or III–V semiconductor materials such as GaAs, InGaAs, AlGaAs or InSb. The semiconductor material may be provided in wafer form. Advantageously, the hollow core waveguides are formed using semiconductor micro-fabrication techniques. Preferably, such micro-fabrication techniques provide fundamental mode waveguides having cross-sections of less than 3 mm, or more preferably less than 1 mm.

A person skilled in the art would recognise that micro-fabrication techniques typically involve a lithography step, followed by an etch step to define the pattern in the substrate material or a layer thereon. The lithography step may comprise photolithography, x-ray lithography or e-beam lithography. The etch step may be performed using ion beam milling, a chemical etch, a dry plasma etch or a deep dry (also termed deep silicon) etch. Preferably, Deep Reactive Ion Etching (DRIE) techniques are used.

Waveguides formed using micro-fabrication techniques of this type provide hollow core waveguides that are significantly smaller in size than prior art hollow dielectric waveguides. Micro-fabrication techniques of this type are also compatible with various layer deposition techniques such as sputtering, electroplating, CVD or other reactive chemistry based techniques.

In a further embodiment, the hollow core waveguides are formed from plastic or a polymer. For example, the hollow core waveguides could be formed using a lithographic process on a "spin-on" polymer coating (e.g. SU8 available from Microchem. Corporation)

Plastic waveguide devices may be fabricated by techniques including hot embossing or injection moulding. The technique involves forming a master. The master may be formed in semiconductor material, such as silicon, using a deep dry etch.

Alternatively, the master may be formed by electro deposition of layers using the LIGA or UV LIGA technique. Once the master is formed, the hollow core waveguides may be formed in a plastic substrate by stamping (i.e. pressing) or hot stamping. The hollow plastic waveguides thus formed may then be coated with a reflective coating.

In a further embodiment, the hollow core waveguides are formed from glass; such as quartz, silica etc.

Conveniently, the hollow core of the device comprises a liquid or a gas such as air.

A gaseous optical gain medium may also be advantageously used to provide amplification of light within the hollow core waveguides. In particular, the use of such a gaseous gain medium in the hollow core multi-mode region permits a high degree of amplification. For example the gaseous gain medium could be a gas discharge formed in a mixture of $CO_2$, $N_2$ and He. This would provide amplification for 10.6 µm radiation.

According to a second aspect of the invention, an optical amplifier comprises a 1-to-N way beam splitter, a multiple element optical amplifier, and a beam recombiner connected in optical series, the optical amplifier acting on at least one of the outputs of the 1-to-N way beam splitter, wherein at least one of the 1-to-N way beam splitter and beam recombiner comprise a hollow core multi-mode interference device according to the first aspect of the invention.

In other words, an optical amplifier incorporates an MMI device according to the first aspect of the invention. The use of such an MMI device, permits the amplifier to provide large amounts of optical power. This is advantageous over prior art amplifiers fabricated from solid core waveguides, in which the maximum optical power density is limited by the physical properties of the material forming the core.

A high order splitting-amplification-recombination is thus possible, thereby allowing the production of high intensity output beams not previously attainable.

Conveniently, the 1-to-N beam splitter and the beam recombiner both comprise hollow core multi-mode interference devices according to the first aspect of the invention. Alternatively, the 1-to-N beam splitter comprises a solid core MMI splitter device.

In a further embodiment, the optical amplifier further comprises phase offset means to adjust the relative phases of the amplified beams prior to beam recombination in the beam recombiner. The phase offset means, which may comprise GaAs modulators or deformable mirrors etc, allows the relative phases of the beams entering the recombiner to be controlled. Ensuring that the beams entering the recombiner device have appropriate phase offsets will increase the efficiency of the recombination process and will allow the recombination region to be shorter in length (especially in high order splitting/recombining devices).

According to a third aspect of the present invention, a resonator comprises a partial reflector, a splitter/recombiner means, a multi-element optical amplifier, and a reflector, the partial reflector, splitter/recombiner means, multi-element optical amplifier and reflector being arranged such that the splitter/recombiner means splits a single beam into N beams where N is greater than or equal to 2, each of the N beams are amplified by the multi-element optical amplifier, reflected by the reflector and redirected to pass back through the multi-element amplifier, the N beams then being recombined by the splitter/recombiner means to form a single beam, a portion of that single beam exiting the resonator through the partial reflector, wherein the splitter/recombiner means is a hollow core multi-mode interference device according to the first aspect of the present invention.

The resonator is effectively a amplifier folded back on itself, and provides the capability for high optical power operation with low levels of optical loss.

BRIEF DESCRIPTION OF THE SEVERAL VIEWS OF THE DRAWINGS

The invention will now be described, by way of example only, with reference to the accompanying drawings in which;

FIG. 1 illustrates a prior art hollow core MMI splitter device and the transverse electric field profile of such a device;

FIG. 5 shows an amplifier and resonator optical circuit incorporating two-way MMI splitter/recombiner devices according to the present invention;

DETAILED DESCRIPTION OF THE INVENTION

Figure 2:
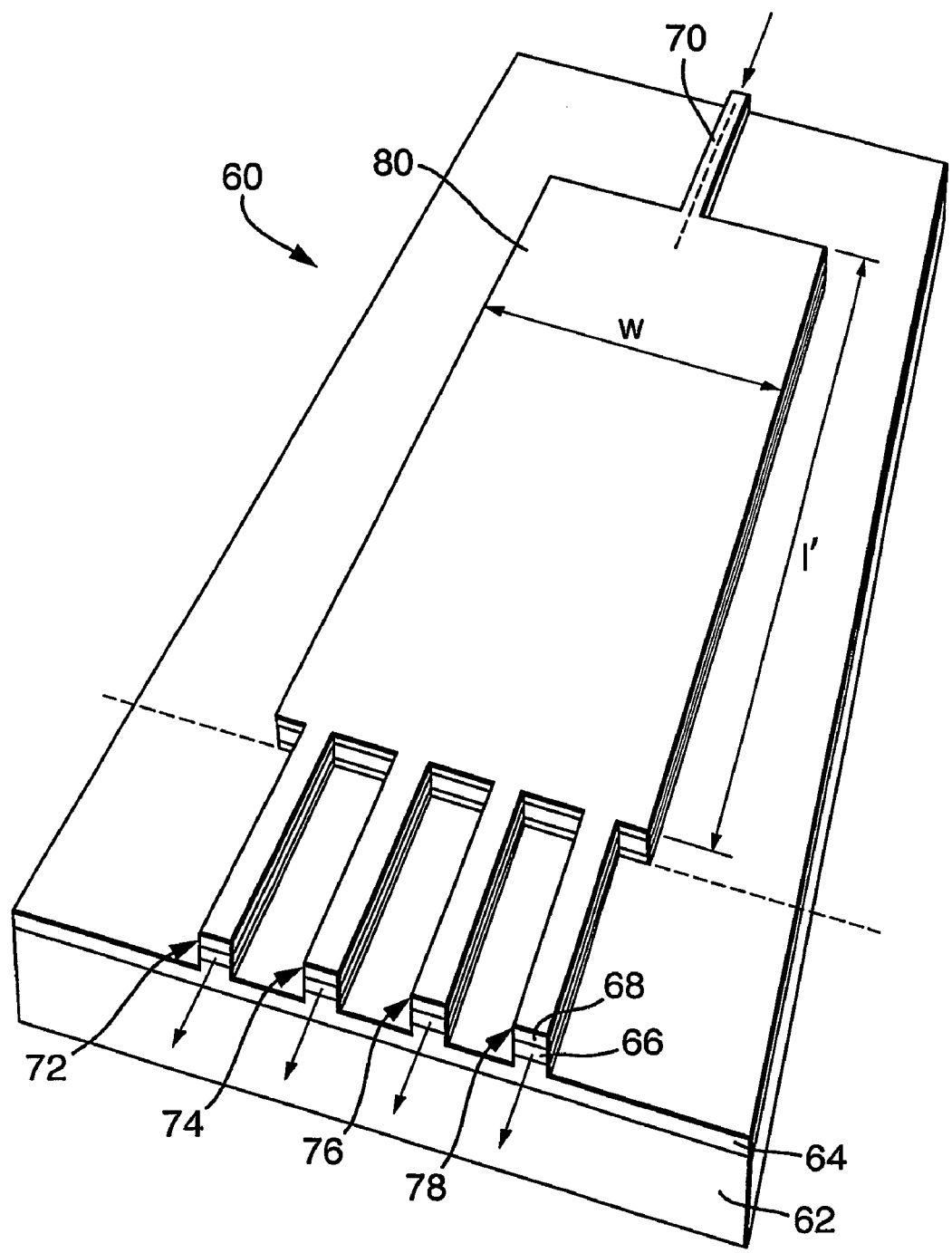
FIG. 2 illustrates a prior art solid core MMI splitter device.

Referring to FIG. 1(a), a perspective view of a prior art two way hollow core waveguide MMI beam splitter 22 is shown. The MMI beam splitter 22 comprises a substrate layer 24, a waveguide layer 26 and a cover layer 28. The waveguide layer 26 defines a hollow core waveguide structure having an input waveguide 30, a multi-mode waveguide region 32 and two output waveguides 34 and 36.

The hollow core multi-mode waveguide region 32 is rectangular; being of length 1 and width W. The input waveguide 30 is ported centrally to, and the output waveguides 34 and 36 are located with the port centers spaced apart across, the multi-mode waveguide region 32. The input waveguide 30 and the output waveguides 34 and 36 are arranged so to support only fundamental mode propagation.

In operation, the fundamental mode supported by the input waveguide 30 is ported into the central multi-mode waveguide region 32. The length (l) and width (w) of the multi-mode waveguide region 32 are selected so that multi-mode interference along its length produces a equal division of the input beam intensity which is coupled into the output waveguides 34 and 36. In this manner, a single input beam of radiation can be split into two output beams. It is also possible to operate the device in reverse to combine two beams.

Referring to FIG. 1(b), the basic principle underlying the multi-mode interference that provides beam splitting is shown. FIG. 1(b) illustrates transverse intensity profiles for electromagnetic radiation of wavelength $\lambda$ at thirteen equally spaced positions along a rectangular multi-mode waveguide region of length L and width W where $L=W^2/\lambda$.

It is assumed that the incident radiation input (i.e. the mode represented by the first transverse intensity curve 56) is a fundamental mode.

It can be seen from FIG. 1(*b*) that a device of length less than L, may be used to perform a beam splitting function. In the case of a two way beam splitter of the type describe in FIG. 1(*a*), a device of length L/2 (=l) is required providing the transverse intensity curve 54. Similarly, three way or four way splitters can be provided if they are of length L/3 and L/4 respectively. In other words, a N-way split can be obtained with a device of length $L/_N = W^2/N\lambda$. A more complete explanation of the operation and design of MMI splitter device is give in U.S. Pat. No. 5,410,625.

Those skilled in the art have, to date, constructed hollow core waveguide structures using dielectric substrate materials having a refractive index less than air (i.e. n<1) at the particular wavelength of operation. In particular, alumina substrates have been used because they have a refractive index, for light of 10.5 µm in wavelength, less than air. This ensures that light propagating through the hollow core will undergo TIR at the interface between air and the substrate.

A disadvantage of using alumina, and other dielectric materials, is that such materials are typically shaped to form hollow core MMI devices using precision engineering (e.g. milling or sawing) techniques. These fabrication techniques limit the minimum size of hollow core device that can be created whilst maintaining the tolerances required for MMI device operation. For example, typical milling techniques allow structures to be defined with a tolerance of not less than 50 µm in waveguides typically not less than 1 mm in width.

Alternative materials that can be used to fabricate hollow core devices of a smaller physical size do not provide sufficient levels of reflection at the air-substrate interface and significant optical losses arising from the Fresnel reflection of light at the interface between the hollow core and the surrounding material are introduced. The optical loss associated with Fresnel reflection in MMI devices, which is exacerbated in smaller size devices, has led those skilled in the art to discount the use of hollow core substrates to produce small size MMI devices. Effort has thus been expended, in the drive for smaller device sizes, on producing solid core MMI waveguide devices.

Referring to FIG. 2, a four-way solid core MMI waveguide structure 60 is shown. The solid core MMI waveguide structure 60 consists of a semi-insulating GaAs substrate layer 62, a lower cladding layer 64, a GaAs core layer 66 and an upper cladding/capping layer 68.

An input waveguide 70 is ported centrally on to a multi-mode waveguide region 80 of width W and length l' and four output waveguides (72,74,76 and 78) are also provided. The input and output waveguides are arranged so as to only support fundamental mode propagation. The length (l') of the multi-mode waveguide region 80 is L/4 (where $L=W^2/\lambda$.) to provide a four way split.

The refractive index of the GaAs core is around 3.5, whilst the surrounding air has a refractive index of around 1. Total internal reflection (TIR) is thus obtained at the interface between the GaAs material and the surrounding air. The TIR that occurs at the interface between the GaAs and air provides a surface reflectivity substantially greater than that found in hollow core device. The overall optical efficiency of the solid core devices of this type is therefore significantly greater than hollow core equivalents.

A disadvantage of solid core MMI splitter devices is that only a limited amount of optical power can be propagated in the solid core before damage to the material forming the core occurs. The power handling capabilities of solid core MMI devices are therefore limited; this places a limitation on the use of such devices in high power applications such as optical amplifiers etc.

Figure 3:
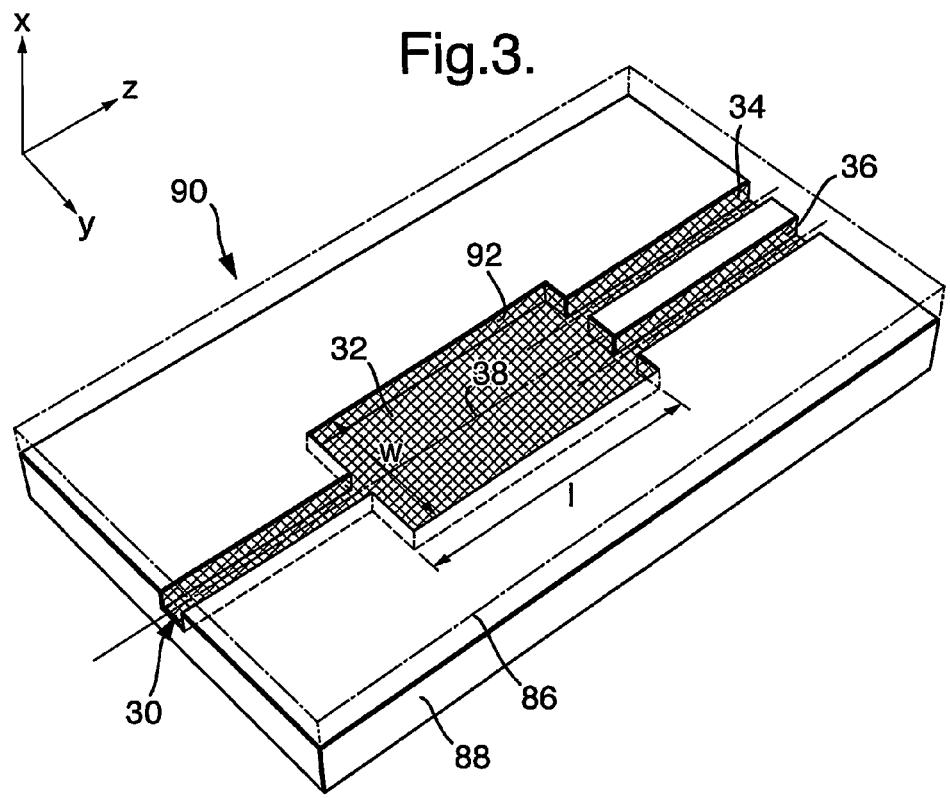
FIG. 3 shows an MMI waveguide device according to the present invention.

Referring to FIG. 3, a perspective view of a two way hollow core waveguide MMI beam splitter 90 according to the present invention is shown; similar elements to those described in previous figures are given like reference numerals.

The MMI beam splitter 90 comprises a substrate 88 and a substrate lid 86. The substrate 88 and the substrate lid 86 define a hollow core waveguide structure having an input waveguide 30, a multi-mode waveguide region 32 and two output waveguides 34 and 36. A layer of gold 92 (indicated by the hatch markings in FIG. 3) is provided on the inner surfaces of the substrate 88 and the substrate lid 86 that define the hollow core waveguide structure. The gold layer 92 should be sufficiently thick to ensure ATIR takes place. A person skilled in the art would recognise that an adhesion promoting layer and/or a diffusion barrier layer (not shown) may also be provided in-between the layer of gold 92 and the substrate.

Apart from any alteration to the length and width of the cavity caused by the addition of the layer of gold metal, the layer of gold 92 does not affect the design of the MMI device. The input waveguide 30, the multi-mode waveguide region 32 and the two output waveguides 34 and 36 are designed using the same criteria used for prior art hollow core MMI devices of the type described with reference to FIG. 1.

The presence of the layer of gold 92 provides ATIR within the hollow core device for light with a wavelength within the telecommunications wavelength band (i.e. for wavelengths around 1.55 µm). At these telecommunication wavelengths, gold has the required refractive index properties of n<1 and low absorption levels.

Although a gold layer 92 is described above, a person skilled in the art would recognise that any material having a refractive index less than air (or whatever is contained within the cavity) at the wavelengths at which the waveguide is to be operated could be deposited on the surfaces defining the hollow core waveguide. The refractive indices of different materials can be found in various publications, such as "the handbook of optical constants" by E. D. Palik, Academic Press, London, 1998. Metals typically have a refractive index less than air over a given wavelength range; the particular wavelength range depending on the physical properties of the metal. The low refractive index of metals at a particular wavelength is generally accompanied by an absorption maxima across a similar wavelength range. Hence, a material should preferably be selected with a refractive index less than air and also with low absorption at the wavelength or wavelengths of device operation.

A skilled person would recognise that, instead of using a single low refractive index layer, multiple layer reflectors could be provided. For example, multiple layer dielectric stacks or metal-dielectrics stacks could be coated on the substrate 88 and/or the substrate lid 86.

A suitable material for the substrate 88 and the substrate lid 86 is silicon; silicon can be etched to a very high degree of accuracy using micro-fabrication techniques of the type known to those skilled in the art. Any material that can be formed in the required physical geometry could be used to produce the MMI device. However, the use of micro-fabricated semiconductors is particularly advantageous as is allows devices to be made that are significantly smaller in size than precision engineered alternatives; micro-fabrication processes can provide sub 1 μm accuracy. Microfabrication also allows multiple structures to be formed in parallel on the substrate, this is unlike precision engineering techniques in which waveguide structures are formed serially by moving a cutting tool across the surface of the substrate.

Ideally, the substrate 88 and the substrate lid 86 should be fabricated from a material suitable for coating with a layer of the low refractive index material. A person skilled in the art would appreciate how the deposition of layers of gold onto silicon, using metal deposition techniques such as sputtering, evaporation, CVD, or plating, can be achieved. A skilled person would also appreciate that the lid could be bonded to the substrate via techniques such as a gold-silicon eutectic bonding or an intermediate layer.

Figure 4:
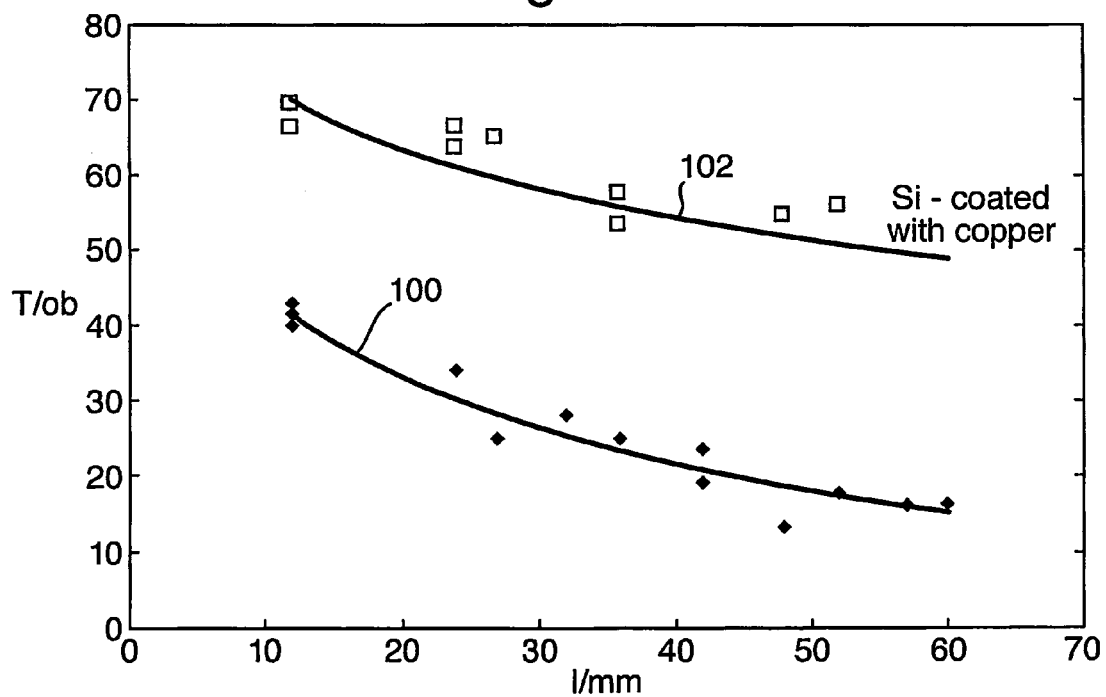
FIG. 4 shows a comparison of experimental data recorded from an MMI device of the present invention and an uncoated hollow core MMI device.

Referring to FIG. 4, experimental data demonstrating the transmission properties of two-way MMI devices of the present invention are shown.

Two-way hollow core waveguide MMI beamsplitters having a multi-mode region width (W) of 250 μm and fundamental mode waveguide widths of 50 μm were constructed. The devices were fabricated using various multi-mode region lengths (l), and with and without a coating of copper metal applied to the internal surface of the hollow core waveguide structure using a nickel adhesion layer.

The first curve 100 shows the total transmission of light through two way hollow core MMI splitters, whilst the second curve 102 shows the transmission of light through two way hollow core MMI splitters with a coating of copper metal applied to their internal surfaces. It is apparent from the experimental data that the application of a layer of copper material to the internal surface of the hollow core beam splitter will almost double the transmission efficiency of the device. This makes the device a practical alternative to solid core devices.

Referring to FIG. 5, several applications are schematically illustrated in which hollow core two-way splitter/combiner MMI devices according to the present invention can be employed.

FIG. 5a shows an amplifier 110. The amplifier 110 comprises a splitter stage 112, a diode array amplifier 114 and a combiner stage 116.

The splitter stage 112 comprises a first two-way MMI splitter 118 and two secondary two-way MMI splitters 120 and 122. Each of the two-way MMI splitters 118, 120 and 122 comprise a single input waveguide 124, two output waveguide 126a and 126b and a central multi-mode region 128. The inputs of the secondary two-way MMI splitters are connected to the outputs of the first two-way MMI splitter 118.

The diode array amplifier 114 comprises 4 separate amplification elements (130a,b,c,d) that are optically connected between the four outputs of the splitter stage 112 and the four inputs of the combiner stage 116. Laser diode arrays of this type are well known to those skilled in the art.

The combiner stage 116 comprises a pair of two-way MMI combiners 132 and 134, and a second MMI combiner 136. Each of the two-way MMI combiners 132, 134 and 136 comprise a pair of input waveguides 138a and 138b, a single output waveguide 140 and a central multi-mode region 128. The outputs of the pair two-way MMI combiners 132 and 134 are connected to the inputs of the second MMI combiner 136.

In operation, the splitter stage 112 divides an incident light beam 142 into four beams; each of equal intensity. The four element diode array amplifier 114 then amplifies each of the four beams, before they are recombined in the combiner stage 116. An amplified resultant output beam 144 thus results.

Referring to FIG. 5b, a resonator structure 150 is shown. The resonator 150 is effectively an amplifier of the type described with reference to FIG. 5a folded back on itself.

The resonator 150 comprises a single MMI stage 152 that has a first two-way MMI splitter/combiner 154 and two secondary two-way MMI splitters/combiners 156 and 158. Each MMI splitter combiner 154, 156 and 158 has a first waveguide 160, two second waveguide 162a and 162b and a multi-mode region 128. The two second waveguide of the first two-way MMI splitter/combiner 154 are optically connected to the first waveguides of the two secondary two-way MMI splitters/combiners 156 and 158. The resonator also comprises a fully reflecting mirror 164 and a partially reflecting mirror 166 and a four element diode array amplifier 114.

In operation the MMI stage 152 performs both a splitting and combining function, and the resonator provides light amplification. The partially reflecting mirror 166 allows a proportion of the light to be extracted as an output beam 168.

Although the amplifier and resonators described with reference to FIG. 5 could be fabricated using known MMI splitters/combiners, it is preferred to use MMI device of the type described with reference to FIGS. 3 and 4. The use of hollow core waveguides without the low refractive index coating would increase the cumulative losses associated with each MMI splitter/recombiner in the system, thereby reducing the light amplification of the diode array amplifier 114. Also, if prior art solid core (e.g. GaAs) MMI splitters/combiners were used the power densities associated with the recombination stage could cause significant degradation of the solid core material. The present invention thus provides optical amplifiers and resonators having high power handling capabilities.

Referring to FIG. 6, a further example of how hollow core MMI devices according to the present invention can be advantageously employed is described.

Figure 6A:
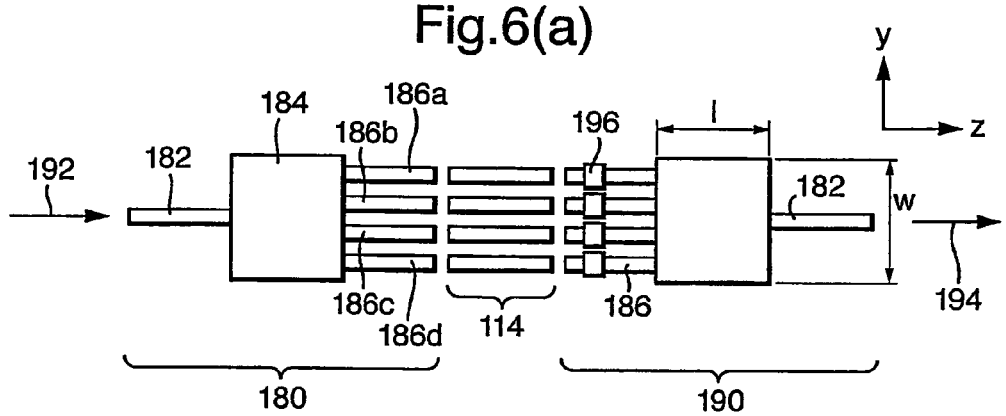
FIG. 6 shows an amplifier and resonator optical circuit incorporating four-way MMI splitter/recombiner devices according to the present invention.

FIG. 6a shows a 1-to-4to1-way amplifier. The amplifier comprises a first four way MMI splitter 180 having an first waveguide 182, a multi-mode region 184 and four second waveguide 186a–d. A four element diode array amplifier 114 is also provide, along with a second four way MMI recombiner 190.

In operation, incident light 192 is coupled into the first waveguide 182 of the first four way MMI splitter 180. The first four way MMI splitter 180 equally splits the light between its four second waveguides 186a–d and passes the light to the four element diode array amplifier 114.

Light emerging from each of the four second waveguides of the first MMI splitter 180 is amplified by each element of the four element diode array amplifier 114, before entering the second waveguides of the second four way MMI recombiner 190. The second four way MMI recombiner 190 then recombines the four amplified light beams to form a single, and amplified, output beam 194.

However, and unlike the two-way splitters described above, the phases of the four light beams entering the MMI recombiner 190 need to be considered. Such phase considerations are only required when the MMI devices are designed to split and recombine three or more beams (i.e. when $N \geq 3$) using the shortest possible multi-mode region lengths.

As described above with reference to FIG. 2, an N-way split can be obtained with the shortest multi-mode region length when the MMI device has a multi-mode region of width W and length $L_N=W^2/N\lambda$. It should also be noted that the wavelength $\lambda$ is the wavelength of light in the multimode region (i.e. the free-space wavelength of light multiplied by the refractive index of the core material).

In terms of the pitch (p) of the axes of the array elements, the multi-mode guide length (l) for an N-way split can be written as:

$$l_N = \frac{(Np)^2}{\lambda} \quad (1)$$

where p is the pitch of the second waveguides (e.g. the pitch of the four waveguides 186a–d of the MMI spitter 180) and p=W/N. It can be seen from equation (1) that the length of the multi-mode guide (l) region scales linearly with the order of the split (i.e. N) for a fixed pitch.

The result of the symmetric splitting process in multi-mode waveguides obeying the geometric design rules described above, is that N fundamental mode fields are produced that have equal amplitude. The phase of the resulting fields are not however equal, and are governed by the relationship;

$$\phi_n = \left\{ \frac{1}{2N} + \frac{N+1}{4} + \frac{n}{N}(n-N-1) \right\}\pi \quad (2)$$

In the case of a four way splitter (i.e. N=4), the relative phases of the 4 output fields are therefore $$\frac{3}{8}\pi, -\frac{1}{8}\pi, -\frac{1}{8}\pi \text{ and } \frac{3}{8}\pi$$

respectively.

In order to efficiently recombine 4 beams using a four way recombiner, the phases of the fields entering the multi-mode waveguide region have to take on values that are the exact phase conjugate of those produced by the splitting process. In other words the phases of the four input fields to the multimode region of MMI recombiner 190 must be $$-\frac{3}{8}\pi, \frac{1}{8}\pi, \frac{1}{8}\pi \text{ and } -\frac{3}{8}\pi$$

respectively for efficient recombination.

Following the above, it is advantageous to introduce phase offsets between the MMI splitter 180 and the MMI recombiner 190 which allow these phase conditions to be satisfied. In general terms the phase offsets required between a 1-to-N way splitter and a N-to-1 way recombiner are given by;

$$\phi_n = -2\left\{ \frac{1}{2N} + \frac{N+1}{4} + \frac{n}{N}(n-N-1) \right\}\pi \quad (3)$$

To establish the required phase offsets in the 1-to-4-to-1-way amplifier of FIG. 6(a), phase off-set means 196 are provided on each of the four second waveguide 186a–d of the MMI recombiner 190. The phase off-set means 196 comprises modifications to the physical lengths of the guides feeding the MMI recombiner 190.

Numerous alternative techniques for producing the required phase off-sets are also known to those skilled in the art. For example, the current in each element of the diode array amplifier 114 could be altered. Alternatively, the optical path length within the diode array amplifier 114 could be altered or the effective refractive index of a section of the waveguide or diode array amplifier 114 could be modified to provide the necessary phase shift.

Figure 6B:
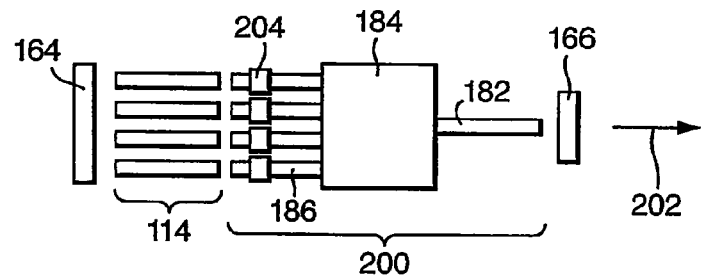

FIG. 6b illustrates a resonator that consists of a single four way MMI splitter/recombiner 200 and a four element diode array amplifier 114. The four way MMI splitter/recombiner 200 has a multi-mode region 184, a first waveguide 182 and four second waveguides 186a–d. Phase off-set means 204 are provided on each of the four second waveguides 186a–d. The resonator also comprises a fully reflecting mirror 164 and a partially reflecting mirror 166.

The resonator is effectively an amplifier folded back on itself, with the result that a double pass through the four way MMI splitter/recombiner 200 results in light amplification. As light passes through the phase off-set means 204 twice during each double pass through the device, the phase off-sets provided by the phase off-set means 204 is half that given in equation (3) above for a amplifier device. The partially reflecting mirror 166 allows a proportion of the light to be extracted as an output beam 202.

Again, hollow core MMI splitters/recombiners of the type described with reference to FIGS. 3 and 4 are advantageous as they provide the ability to handle high optical powers with low levels of attenuation.

Figure 7:
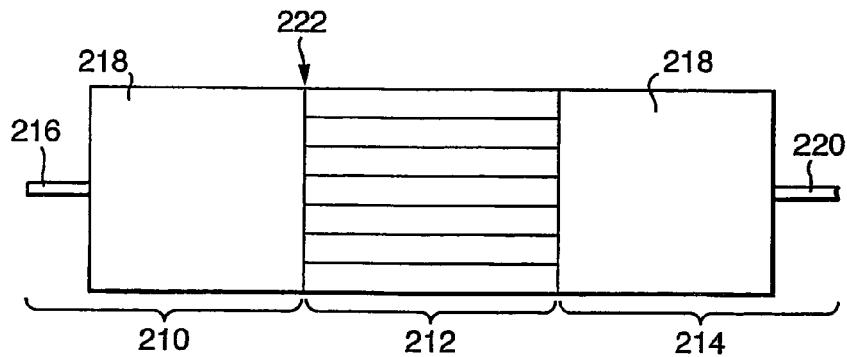
FIG. 7 shows an alternative configuration for an amplifier incorporating MMI splitter/recombiners devices according to the present invention.

Referring to FIG. 7, an alternative embodiment of the amplifier described with reference to FIG. 6(a) is provided. The amplifier comprises a 7-way MMI splitter 210, a 7 element diode array chip 212 and a 7-way MMI recombiner 214. The 7-way MMI splitter 210 has an input waveguide 216 and a multi-mode region 218. The 7-way MMI combiner 214 has an output waveguide 220 and a multi-mode region 218.

The multi-mode regions 218 of both the MMI splitter 210 and the MMI combiner 214 are directly optically coupled to either side of the 7 element diode array chip 212. The dimensions of the multi-mode region 218 of the MMI splitter 210 are such that a incident fundamental mode entering that region from the input waveguide 216 is split into 7 beams of equal intensity at the interface 222 with the diode array chip 212. The 7 beams are then amplified by the diode array chip 212, before entering the MMI recombiner 214 when they are recombined to form a single beam that exits the device through the output waveguide 220. In this device, any necessary phase offsets are provided in the diode array chip region.

In common with the amplifier and resonator devices described with reference to FIG. 6, the integrated amplifier device of FIG. 7 advantageously comprises an MMI splitter 210 and/or an MMI recombiner 214 of the type described with reference to FIGS. 3 and 4

Figure 8:
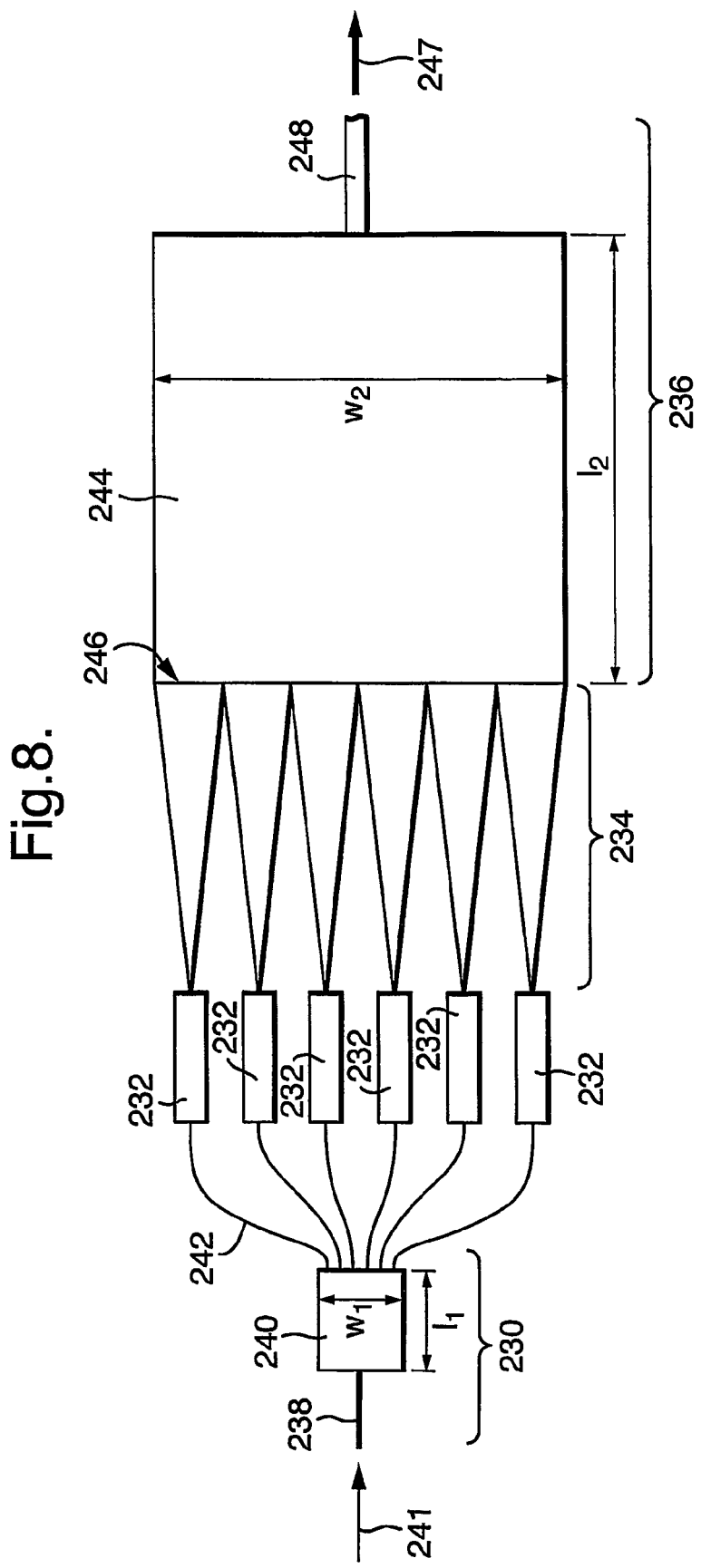
FIG. 8 shows a hybrid optical amplifier circuit incorporating solid core MMI splitter devices and a MMI recombiner according to the present invention.

Referring to FIG. 8, a hybrid amplifier is shown. The hybrid amplifier comprises a solid core MMI splitter 230, six phase shifting means 232, a tapered diode amplifier array 234 and a hollow core MMI combiner 236.

The solid core MMI splitter 230 is fabricated from GaAs and has a single input waveguide 238, a multi-mode region 240 and six output waveguides 242. The width ($w_1$) and length ($l_1$) of the multi-mode region 240 is selected such that an input beam 241 coupled into the input waveguide 238 is split into the 6 output waveguides 242.

Each of the 6 output waveguides 242 fan out to a phase shifting means 232. The phase shifting means 232 comprise electro-optic modulators, again fabricated from GaAs, that impose a phase shift to the optical beam on application of a suitable voltage. The phase shifts applied to each beam to ensure efficient recombination is governed by equation (3) above. The phase shifting means 232 also compensates for the phase errors introduced by the fan out process itself. Phase errors that are introduced during the manufacturing process, such as cleave error, inconsistencies in the waveguide properties, can also be compensated for by the phase shifting means 232.

It should be noted that as well as needing to achieve appropriate phase off-sets for efficient recombination, the beams must also be of equal amplitude. Equal amplitude correction could be achieved in a variety of ways that are known to those skilled in the art. For example, a Mach-Zehnder variable attenuator (not shown) could be placed on each output waveguides 242 before the phase shifting means 232.

The phase shifted beams which exit the phase shifting means 232 are coupled in to a tapered diode amplifier array 234, which individually amplifies each of the 6 beams. A tapered amplifier suitable for this task is described in P Wilson et al, Electronics letters, 7 Jan. 1999, Vol.35 No.1.

Once amplified, the 6 optical beams are coupled directly into the multi-mode region 244 of the hollow core MMI recombiner 236. To ensure reflections are minimised at the interface between the solid elements of the tapered diode amplifier array 234 and the hollow core multi-mode region 244, an anti-reflection coatings 246 is provided.

The width ($w_2$) and length ($l_2$) of the multi-mode region 244 are selected such that the six amplified beams entering that region are recombined and the amplified output beam 247 exits the device through the output waveguide 248. It should be noted that the dimensions of the solid core MMI splitter 230 and the hollow core MMI recombiner 236 are different because of the difference in refractive index of GaAs and air (approximately 3.5 compared to 1.0 respectively); this makes the solid core MMI splitter 230 physically smaller in size than the hollow core MMI recombiner 236.

Although a 1-to-6-to-1 amplifier is described above, a person skilled in the art would recognise that a much higher degree of splitting and recombining is possible. As the amount of power that requires optical combination increases, the power handling capabilities of the recombiner must increase accordingly.

In a hybrid amplifier of the type described in FIG. 8, solid core MMI devices are used to split the incident beam of radiation as such devices are typically more compact than hollow core equivalents and will provide efficient beam splitting of a low power incident beam. However, when recombining the amplified signals solid core devices would be unable to handle the increased optical power without damage to the solid core material occurring. The use of an MMI recombiner of the type described with reference to FIGS. 3 and 4 allows efficient recombination of the high intensity beams without the possibility of core damage to the recombiner device.

The MMI devices described above provides a split in one dimension (e.g. horizontal). It is however possible to also provide a split in a second (e.g. vertical) direction as described with reference to FIGS. 17 and 18 of U.S. Pat. No. 5,410,625. In this way a single input beam can be split into M×N beams. The two dimensional splitting can be consider as an N-way split in a first dimension (e.g. horizontal) and as an M-way in a second dimension (e.g. vertical).

For the case of a symmetric field fed into a rectangular waveguide that supports multi-mode propagation in two dimension, the M-way and N-way splits can be given by:

$$L_{W1_M}^{sym} = \frac{pW_1^2}{\lambda} + \frac{W_1^2}{M\lambda} \quad (4a)$$

$$L_{W2_N}^{sym} = \frac{qW_2^2}{\lambda} + \frac{W_2^2}{N\lambda} \quad (4b)$$

where $W_1$ is the guide width, $W_2$ is the guide depth, p and q are integers and $\lambda$ is the wavelength of propagating light. Hence, selecting $pW_1$ and $qW_2$ such that $$L_{W1_M}^{sym} = L_{W2_N}^{sym}$$

will provide an M×N field.

For the case of an asymmetric field fed into a rectangular guide that supports multi-mode propagation in two dimension, the M-way and N-way splits can be given by:

$$L_{W1_M}^{ASY} = \frac{8pW_1^2}{\lambda} + \frac{4W_1^2}{M\lambda} \quad (5a)$$

$$L_{W2_N}^{ASY} = \frac{8qW_2^2}{\lambda} + \frac{4W_2^2}{N\lambda} \quad (5b)$$

where $W_1$ is the guide width, $W_2$ is the guide depth, p and q are integers and $\lambda$ is the wavelength of propagating light. Again, selecting $pW_1$ and $qW_2$ such that $$L_{W1_M}^{ASY} = L_{W2_N}^{ASY}$$

will provide an M×N field. Furthermore, feeding an asymmetric fundamental mode in to the multi-mode waveguide region is analogous to inputting a multi-mode field.

Figure 9:
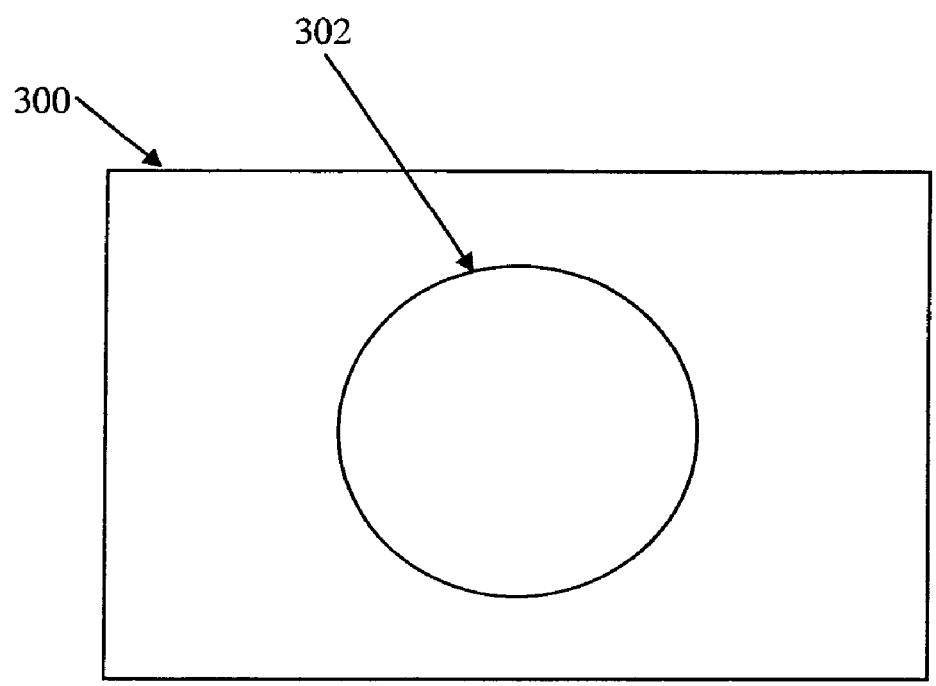
FIG. 9 shows a cross-sectional view of a hollow core multi-mode waveguide region having a substantially circular cross-section.

Referring to FIG. 9, an MMI device (300) is shown in which the hollow core multi-mode waveguide region (302) has a substantially circular cross-section. The diameter and length of the hollow core multi-mode waveguide region are selected to provide re-imaging of the optical input field carried by said at least one hollow core input waveguide.

The invention claimed is:

1. A multi-mode interference device comprising a hollow core multi-mode waveguide region optically coupled to at least one hollow core input waveguide, wherein the internal surfaces of said hollow core waveguides carry a reflective coating.

2. A device as claimed in claim 1 wherein the reflective coating comprises at least one layer of material having a refractive index less than that of the waveguide core within the operating wavelength band.

3. A device as claimed in claim 2 wherein at least one of the at least one layers of material carried on the internal surface of the hollow core waveguides is metal.

4. A device as claimed in claim 3 wherein the metal is any one of gold, silver or copper.

5. A device as claimed in claim 1 wherein the reflective coating comprises one or more layers of dielectric material.

6. A device as claimed in claim 1 for operation with radiation between 1.4 µm and 1.61 µm in wavelength.

7. A device a claimed in claim 1 wherein at least one hollow core input waveguide is a fundamental mode waveguide.

8. A device as claimed in claim 1 wherein the at least one hollow core input waveguide is a multi-mode waveguide.

9. A device as claimed in claim 1 wherein the hollow core multi-mode waveguide region has a substantially rectangular cross-section.

10. A device according to claim 9 wherein said at least one hollow core input waveguide carries an optical input field and the dimensions of the hollow core multi-mode waveguide region are selected to provide re-imaging of said optical input field carried by said at least one hollow core input waveguide.

11. A device as claimed in claim 9 wherein opposite surfaces forming the rectangular internal cross-section of the hollow core multi-mode waveguide region have substantially equal effective refractive indices and adjacent surfaces forming the rectangular internal cross-section hollow core multi-mode waveguide region have different effective refractive indices.

12. A device as claimed in claim 1 wherein said at least one hollow core input waveguide carries an optical input field and the hollow core multi-mode waveguide region has a substantially circular cross-section and the diameter and length of the hollow core multi-mode waveguide region are selected to provide re-imaging of the optical input field carried by said at least one hollow core input waveguide.

13. A device as claimed in claim 1 wherein the hollow waveguides of the multimode interference device are formed in semiconductor material.

14. A device a claimed in claim 13 wherein the semiconductor material comprises Silicon.

15. A device as claimed in claim 13 wherein the hollow core waveguides are formed using semiconductor micro-fabrication techniques.

16. A device according to claim 15 wherein the semiconductor micro-fabrication technique is Deep Reactive Ion Etching.

17. An device as claimed in claim 1 wherein the hollow core waveguides are formed in a layer of plastic or polymer.

18. An device as claimed in claim 1 wherein the hollow core waveguides are formed from glass.

19. A device as claimed in claim 1 wherein the hollow core waveguides comprises gas.

20. A device as claimed in claim 19 wherein the gas is air.

21. A device as claimed in claim 19 wherein the gas is an optical gain medium.

22. A device as claimed in claim 1 wherein the hollow core comprises liquid.

23. An optical amplifier comprising a 1-to-N way beam splitter, a multiple element optical amplifier, and a beam recombiner connected in optical series, the optical amplifier acting on at least one output of the 1-to-N way beam splitter, wherein at least one of the 1-to-N way beam splitter and beam recombiner comprise a hollow core multi-mode interference device comprising a hollow core multi-mode waveguide region optically coupled to at least one hollow core input waveguide, wherein the internal surfaces of said hollow core waveguides carry a reflective coating.

24. An optical amplifier as claimed in claim 23 wherein the 1-to-N beam splitter and the beam recombiner both comprise hollow core multi-mode interference devices.

25. An optical amplifier as claimed in claim 23 wherein the 1-to-N beam splitter comprises a solid core multi-mode interference splitter device.

26. An optical amplifier as claimed in claim 23 and further comprising phase offset means to adjust the relative phases of the amplified beams prior to beam recombination in the beam recombiner.

27. A resonator comprising:
a partial reflector,
a splitter/recombiner means,
a multi-element optical amplifier, and
a reflector,
the partial reflector, splitter/recombiner means, multi-element optical amplifier and reflector being arranged such that the splitter/recombiner means splits a single beam into N beams where N is greater than or equal to 2, each of the N beams are amplified by the multi-element optical amplifier, reflected by the reflector and redirected to pass back through the multi-element optical amplifier, the N beams then being recombined by the splitter/recombiner means to form a single beam, a portion of that single beam exiting the resonator through the partial reflector,
wherein the splitter/recombiner means is a hollow core multi-mode interference device comprising a hollow core multi-mode waveguide region optically coupled of at least on hollow core input waveguide, wherein the internal surfaces of said hollow core waveguides carry a reflective coating.

* * * * *